United States Patent [19]
Lewis

[11] Patent Number: 5,893,115
[45] Date of Patent: Apr. 6, 1999

[54] ISOCHRONAL UPDATING OF DATA RECORDS

[75] Inventor: Stephen Gerard Lewis, Pickerington, Ohio

[73] Assignee: Lucent Technologies, Inc., Murray Hill, N.J.

[21] Appl. No.: 564,701

[22] Filed: Nov. 29, 1995

[51] Int. Cl.[6] ....................................................... G06F 17/30
[52] U.S. Cl. ................................. 707/201; 707/3; 707/7; 707/101
[58] Field of Search .......................... 395/617; 707/201, 707/1, 3, 200, 202, 101, 8, 7; 364/282.1, 962.1, 962, 222.81, 282.4, 283.1, 283.4

[56] References Cited

U.S. PATENT DOCUMENTS

| | | | |
|---|---|---|---|
| 4,648,036 | 3/1987 | Gallant | 364/300 |
| 5,398,335 | 3/1995 | Levis | 707/1 |
| 5,404,502 | 4/1995 | Warner et al. | 395/575 |
| 5,483,590 | 1/1996 | Chiu et al. | 379/269 |
| 5,493,728 | 2/1996 | Solton et al. | 395/250 |
| 5,586,310 | 12/1996 | Sharman | 395/600 |
| 5,627,961 | 5/1997 | Sharman | 395/182.04 |

FOREIGN PATENT DOCUMENTS

| | | | |
|---|---|---|---|
| 204449A2 | 12/1986 | European Pat. Off. | G06F 15/16 |
| 0458623 | 11/1991 | European Pat. Off. | G06F 15/40 |
| 3-113544 | 5/1994 | Japan | G06F 11/20 |

OTHER PUBLICATIONS

U. Inoue et al., "A Relational Database Processor for Non–indexed queries" 1st Intl Symp. Database systems for advanced application pp. 382–386, Apr. 1989.

C.H.C. Leung et al. "Analysis and Optimization of data currency and consistency in replicated distributed database," The computer Journal, vol. 28, No. 5 pp. 518–523, Jan. 1985.

*Primary Examiner*—Thomas G. Black
*Assistant Examiner*—Jean M. Cornelus
*Attorney, Agent, or Firm*—Charles L. Warren

[57] ABSTRACT

Records stored in a database are reset on an as-accessed basis. A record in the database to receive new data is identified when new data arrives to be incorporated with existing data in a given field. A next reset date stored in the record is read and compared with the current date. If the current date is later than the next reset date, the existing data in the field is replaced with a predetermined default value prior to incorporating or incrementing the new data in the field. Additionally, another next reset date is calculated and substituted for the previous next reset date in the record.

28 Claims, 3 Drawing Sheets

| RECORD NUMBER | RESET INTERVAL | TREATMENT | NEXT RESET DATE | COUNTER 1 | --- | COUNTER N |
|---|---|---|---|---|---|---|
| 708-979-1111 | TUESDAY | 7 | 28 NOV. 95 | 3.50 | --- | 17.00 |
| 312-778-1234 | MONTHLY 21 | 31 | 21 DEC. 95 | 133.00 | --- | 253.50 |

ISOCHRONAL UPDATING OF DATA RECORDS

BACKGROUND OF THE INVENTION

This invention generally addresses the updating of records stored in a database and more specifically, addresses databases which contain records which must be periodically updated such as by resetting or clearing fields in a record.

A number of applications exist in which a database stores a plurality of records which require periodic updating. For example, a database in a telecommunication system may keep a record for each of its subscribers. The record may include a data field which functions as a counter that keeps a cumulative count of the approximate usage (in time or dollar value) by the subscriber over a time interval such as a billing period. Such records are updated on a periodic basis in order to reset the counter values to zero or to a predetermined default value at the beginning of an interval.

In one known approach for periodically resetting the records, a batch program is executed which searches all records to determine if periodic updating of the record is needed. Such processing consumes substantial computational resources in the searching, determining if an update is required, and the updating of each record at the beginning of every possible time interval. This technique also limits the accuracy of the records in that the updating of the records is limited to the frequency at which the batch program is executed and is incapable of performing the update at the exact time desired for each record.

Other applications also rely on databases which maintain records with cumulative counters to track corresponding events. For example, a tollway system may desire to maintain a running total of the tolls received from motorists. Desirably, the records are updated or reset, in this case to zero, on a periodic basis such as every 24 hours or every week in order to maintain statistics relating to the amount of tolls collected. This information can be utilized in a variety of ways including theft prevention and revenue forecasting.

The above-noted disadvantages associated with record updates by batch programs are exacerbated as the frequency of updates increases and as the number of records in the database increases. For a database, especially one containing a large number of records, these disadvantages give rise to a need for an improved technique for updating such records.

SUMMARY OF THE INVENTION

It is an object of the present invention to provide an improved solution to the above difficulties wherein a record updating technique facilitates the updating of records on an as-accessed basis.

In accordance with an embodiment of the present invention, a method is provided for updating records stored in a database. A record in the database is identified to receive new data for incorporation into existing data. Each record stores a next reset date which is read and compared with the current date at the time of record access. If the current date is later than the next reset date, the existing data is changed to a predetermined default value prior to incorporating the new data; also, a new next reset date is calculated and stored. If the current date is prior to the next reset date, the new data is incorporated with the existing data. This permits information stored in a field to be reset based upon the relationship between the current date during a data update access and the next reset date stored in the record.

DETAILED DESCRIPTION

Figure 1:
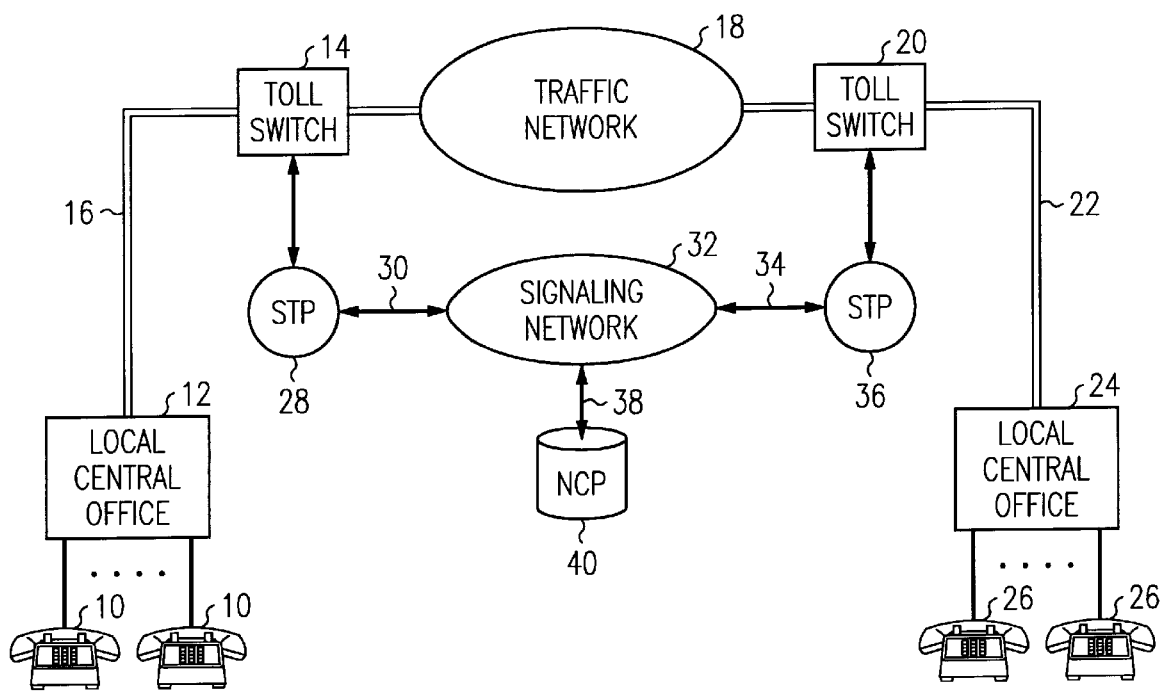
FIG. 1 is a block diagram of a telecommunication network which incorporates an embodiment of the present invention.

FIG. 1 illustrates a telecommunication network which incorporates an embodiment of the present invention. Subscribers are provided telecommunication services via consumer premises equipment (CPE) 10 as connected to local central office 12. Trunks 16 provide a plurality of communication channels between local central office 12 and toll switch 14. The toll switch 14 is connected to a traffic network 18 which may comprise other toll switches and transmission facilities which carry the subscriber's data. Toll switch 20 is connected to network 18 and to local central office 24 by trunks 22. Subscribers served by central office 24 utilize CPE 26.

A signal transfer point 28 is connected to toll switch 14 and to signaling network 32 by signaling channels 30. The network 32 may comprise a plurality of other STPs and other transmission facilities suited for carrying signals and messages associated with the assignment and maintaining of calls handled by the telecommunication network. The STPs and signaling network may utilize common channel signaling such as SS7 signaling employed in telecommunication networks. Data channels 34 couple signaling network 32 to STP 36 which is also coupled to toll switch 20. The STPs and signaling network 32 are coupled by signaling channel 38 with network control point (NCP) 40. The NCP acts as a database which stores records and data utilized in handling and processing traffic on the telecommunication network.

In an illustrative embodiment of the present invention, NCP 40 stores a record for each billed subscriber in which totals of cumulative charges of different types of calls are maintained. Since the NCP database may maintain records for each of millions of subscribers, it will be apparent that maintaining and updating these records represents a substantial task in addition to operational database queries and messages handled by the NCP. Accordingly, an embodiment of the present invention is incorporated to provide an efficient technique for updating and resetting fields of subscriber records stored in the database.

Figures 2, 3:
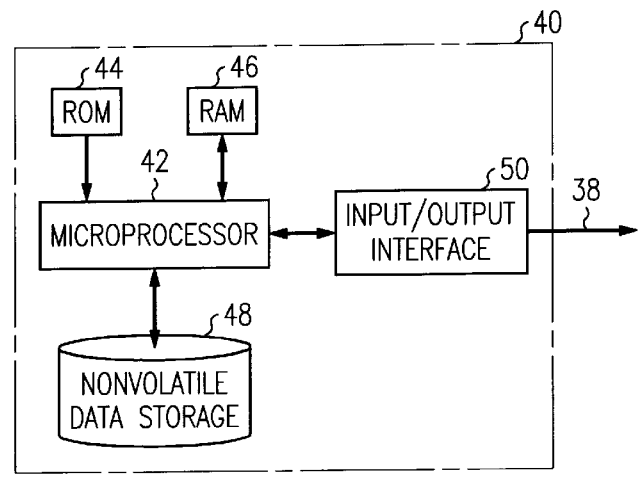
FIG. 2 is a block diagram of the network control point (NCP) database as shown in FIG. 1.
FIG. 3 illustrates a plurality of exemplary records which may be stored by the NCP database in accordance with an embodiment of the present invention.

FIG. 2 is a block diagram of NCP 40 as shown in FIG. 1. The exemplary embodiment includes a microprocessor 42 and supporting peripherals including read-only memory (ROM) 44, random access memory (RAM) 46, nonvolatile data storage device 48, and an input/output interface device 50 which supports the reception and transmission of signals via channel 38. The nonvolatile data storage unit 48 may comprise a disk drive or other electronic media which is nonvolatile. The microprocessor 42 operates under program control instructions stored in ROM 44 and RAM 46. The microprocessor operates to receive queries (messages) concerning information stored in records typically contained in nonvolatile data storage unit 48 and RAM 46. In response to operational queries, the microprocessor 42 initiates program control instructions to find data requested by the query and transmits appropriate data found in corresponding records to the origination source of the query. In addition to the database activities associated with responding to queries, data storage unit 48 contains a database in accordance with an embodiment of the present invention in which subscriber billing records are maintained and updated.

FIG. 3 visually represents the billing records stored by data storage unit 48. Each subscriber record may include data stored in columns 52, 54, 56, 58, 60, and 62. The rows indicated by exemplary records 64 and 66 correspond to individual subscribers. Column 52 provides a telephone number or other record identifier which serves as an index to locate records stored in the database. It will be apparent to those skilled in the art that in the exemplary application, the record number may comprise the telephone number of a corresponding subscriber which is used as an index to locate the records. Column 54 stores a reset interval which may vary for each subscriber or record. The reset interval may comprise a day of a week which reflects a weekly record updating or may reflect a day of a month which would reflect a monthly updating of data stored in fields 60 and 62. Where a date is specified, the time associated with the date may be a predetermined time such as 12:01 a.m. or any other time desired in accordance with system administration. The length of time interval will vary depending on the specific application and environment. Column 56 stores a code or index which defines the treatment the record and the data stored in the record will receive when updated with new information. Column 58 stores a next reset date (NRD) for each record. In accordance with an embodiment of the present invention, the NRD is compared with the current date of access of the record and causes the stored data associated with the record to be updated differently depending upon the results of the comparison. An example of this process will be explained below. Columns 60 and 62 represent a plurality of counters which contain cumulative values for each subscriber. In the illustrative example, these values represent approximate dollar charges on a cumulative basis where each counter represents a type of call made by the subscriber. Thus, the information stored in columns 60–62 permits the current status of a subscriber's account to be determined such as for toll fraud monitoring as well as other actions which may be taken based upon predetermined thresholds or the rate of change of the cumulative amounts.

In the record associated with subscriber 64 as shown in FIG. 3, the subscriber has a billing number of 708-979-1111 and has a reset interval of "Tuesday". This indicates that on each Tuesday, the counters in columns 60–62 are to be reset either to zero or to predetermined amounts. The value of "7" in the treatment column 56 provides an index to a table of actions to be taken following an updating of the record. A plurality of types of treatment may be provided to accommodate a wide variety of different conditions which may be encountered by different subscribers and by different data levels and conditions anticipated. The treatment instructions (i.e. threshold limits) are stored as records in another database and located by the corresponding values stored in column 56 in order to define the corresponding treatment to be accorded. The NRD of "28 Nov. 95" comprises a date, in accordance with an embodiment of the present invention, which will be compared with the current date that the record 64 is accessed for a data update, i.e. increment of a cumulative charge amount. The value "3.50" in column 60 and the value "17.00" in column 62 may reflect corresponding dollar amounts associated with different classes or types of calls made by subscriber 64 during the current interval over which cumulative charges for each type of call are being maintained. The information stored in corresponding columns associated with subscriber 66 represents similar data to that previously explained with regard to subscriber 64. It will be noted that with regard to subscriber 66, the reset interval occurs monthly on the 21st day of the month. Additionally, the treatment indicated by index "31" indicates that a different treatment of the data stored in the record associated with subscriber 66 will be provided as contrasted with the treatment indicated by value 7 associated with subscriber 64.

Figure 4:
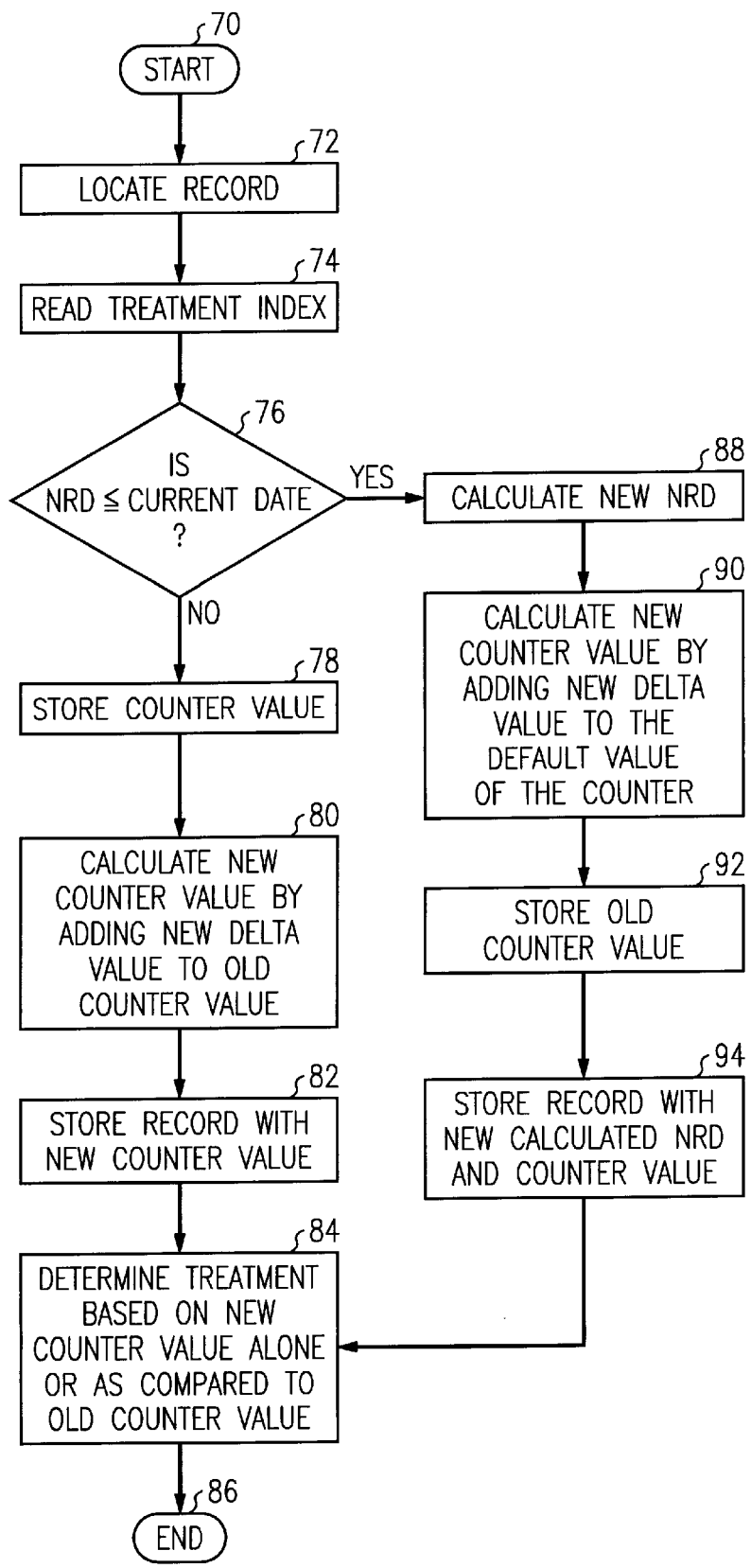
FIG. 4 is a flow diagram illustrating a method in accordance with an embodiment of the present invention.

FIG. 4 is a flow diagram illustrating steps in an exemplary embodiment of the present invention. This example reflects actions to update records such as shown in FIG. 3 by the NCP 40.

These steps begin with START 70 when a request is made to modify one of the cumulative count values in one of the counters 60, 62, associated with a particular subscriber based on new information. The new information in the illustrative example comprises another incremental charge attributed to the subscriber based on use of the toll network. To enter this information, a request is made to update a counter associated with the type of call associated with the charge. In response to such a request, step 72 locates the record of the subscriber associated with the information to be updated. In the exemplary embodiment the record may be located by reference to the record numbers 52 which my correspond to billing numbers associated with the subscribers. Following the location of the subscriber's record and in accordance with step 74, the treatment index stored in column 56 of the subscriber record is read. Next, a determination is made in step 76 of whether the next reset date (NRD) is less than or equal to the current date, that is, the time at which the record is being accessed. A NO decision reflects that the current date has not yet reached or exceeded the next reset date.

Following a NO determination by step 76, the values of the counter to be updated is temporarily stored at another memory location for later use as will be described below. Next in step 80 a new counter value is calculated by adding a new delta value (another charge) to the existing or old counter value corresponding to the same type of data. Referring to FIG. 3, assume that an update request is made with regard to subscriber 64 and that the update contains a new delta value associated with a call type stored in counter 1 (column 60). Thus, the value 3.50 will be temporarily stored in another location and a new delta value such as 1.25 added to the existing value thus, resulting in a new cumulative value of 4.75. In accordance with step 82, this new counter value is stored in counter 1 of the record for subscriber 64. In accordance with step 84, the treatment to be accorded the values then stored in the count (following the updating of a counter) is determined based on the treatment index of column 56. Thus, "7" in treatment column 56 is used as an index associated with subscriber 64 to access another table which stores predefined courses of action or treatment to be taken based upon the value stored in the counters. Treatment 7 may comprise a plurality of threshold values associated with each counter wherein each threshold value has a separate predetermined action to be taken when the updated cumulative value of the counter first exceeds a corresponding threshold. For example, treatment 7 for subscriber 64 could include three thresholds associated with long distance collect calls which are tracked by counter 1. A first threshold could be an absolute dollar value such as $20 which, if reached, would cause an alert message to be sent to a system administrator suggesting high usage during the time interval for subscriber 64. A second threshold of $35 associated with counter 1 could cause an alert message to be generated to a system administrator recommending that the account be temporarily closed in view of extreme excess charges relative to the normal pattern associated with subscriber 64. The third threshold could comprise an incremental rate of change threshold, such as $10 which would be triggered for any single update in which the cumulative value increased by $10 or more. This could cause an appropriate status message to be generated alerting a system administrator to unusual activity. In accordance with step 84, such treatments can be based on the new counter value alone such as relative to an absolute dollar threshold or as compared to the old counter value such as the case of a rate of change threshold. Following step 84, the database updating actions terminate at END 86.

A YES decision by step 76 reflects that the current date is equal to or later than the next reset date. In accordance with step 88, a new next reset date (NRD) is calculated based upon the reset interval information stored in column 54 and relative to the current date. For example, if the record of subscriber 64 was accessed on a Thursday following the Tuesday reset interval as indicated in column 54, the next reset date would be computed to be the next Tuesday following the current date. This value is then stored in the NRD column 58 replacing the previous NRD date. In accordance with step 90, a new counter value is computed by adding the new delta value associated with the update request to a predetermined default value for the counter. In the illustrative example, the counters may be reset to zero indicating the start of a new period for accumulating charges. In this situation, the new delta value would be added to zero resulting in a cumulative value of the delta value in the associated counter. The other counters during this access will also be reset to a predetermined amount, such as zero in this example, in preparation for receiving new information during the next interval. In accordance with step 92, the existing or old value of the counter prior to being reset is temporarily stored in another location. In accordance with step 94, the record is stored with the new calculated next reset date and counter values. Next, step 84 provides the same actions based on treatments stored in the record as previously explained based on the new calculated values and the temporarily stored old counter values. As explained above, this processing terminates at END 86 following the execution of step 84.

It will be noted that the illustrative embodiment of the present invention eliminates the need to provide a periodic or batch searching and resetting of counters in the records stored in the database. Each record is reconsidered for resetting of the counters, prior to the utilization of data stored in the counters, each time a record is accessed. This eliminates the substantial computing resources and time required for searching and resetting of records during a periodic reset interval as in previously known methods. The use of the next reset date as a parameter relative to the current date during the time of access for an updating of the record enables the counter values to be reset prior to new data calculation.

It will be apparent to those skilled in the art that various modifications and changes may be implemented to the illustrative embodiment. For example, the counters may comprise data fields which monitor information other than cumulative values associated with certain types of events. Additionally, additional fields or columns could be added to the exemplary record structure shown in the example of FIG. 3 to include additional information or data associated with each record. It will be apparent that the exemplary database may be utilized in systems to store information other than for telephone subscribers and that various types of indicia may be utilized as a record locator such as illustrated in column 52.

Although an illustrative embodiment of the present invention has been described above and illustrated in the drawings, the scope of the invention is defined by the claims which follow.

The invention claimed is:

1. A method for updating records stored in a database comprising the steps of:

reading a next reset date associated with one of the records in the database;

comparing the next reset date with a current date;

determining, based on said comparing step, whether to change existing data stored in a first field of said one record before using said stored data;

reading a treatment value stored in the one record and using the treatment value to locate a parameter that defines an operation to be performed on the data in said first field;

comparing the existing data stored in the first field to the parameter; and generating a message dependent on the result of the comparison.

2. The method according to claim 1 further comprising the steps of:

calculating another next reset date if the current date is past the next reset date; and if another next reset date is calculated, replacing the next reset date stored in the record with the another next reset date.

3. The method according to claim 2 further comprising the step of reading interval data stored in the one record in a reset interval field, said calculating step basing the another next reset date on the interval data.

4. A database that stores records which are updated with information comprising:

means for reading a next reset date associated with one of the records in the database;

means for comparing the next reset date with a current date;

means, coupled to said comparing means, for determining whether to change existing data stored in a first field of said one record before using said stored data based on results of said comparing means;

means for reading a treatment value stored in the one record and using the treatment value to locate a parameter that defines an operation to be performed on the data in said first field means for comparing the data stored in the first field to the parameter; and means for generating a message dependent on the result of the comparison.

5. The database according to claim 4 further comprising means for:

calculating another next reset date if the current date is past the next reset date; and means for replacing the next reset date stored in the record with the another next reset date if another next reset date is calculated.

6. The database according to claim 5 further comprising means for reading interval data stored in the one record in a reset interval field, said means for calculating basing the another next reset date on the interval data.

7. A method for updating records stored in a database comprising the steps of:

reading a next reset date associated with one of the records in the database;

comparing the next reset date with a current date;

if the current date is later than the next reset date, changing existing data in a first field to updated data which is calculated based on a first default value and new data;

if the current date is prior to the next reset date, combining the existing data in the first field with the new data, whereby information stored in the first field is updated based on a relationship between the current date and the next reset date.

8. The method according to claim 7 further comprising the steps of:

calculating another next reset date if the current date is past the next reset date; and if another next reset date is calculated, replacing the next reset date stored in the record with the another next reset date.

9. The method according to claim 8 further comprising the step of reading interval data stored in the one record in a reset interval field, said calculating step basing the another next reset date on the interval data.

10. The method according to claim 7 further comprising the steps of reading a treatment value stored in the one record and using the treatment value to locate a parameter that defines an operation to be performed on the existing data in said first field.

11. The method according to claim 10 further comprising the steps of comparing the existing data stored in the first field and the parameter, and transmitting an alert message dependent on the result of the comparison.

12. The method according to claim 10 further comprising the steps of storing the existing data prior to incorporation of the new data, comparing at least one of the existing data and the new data to the parameter, and generating a message dependent on the result of the comparison.

13. The method according to claim 7 wherein said step of changing the existing data in the first field is executed without retrieving the first default value from another record.

14. The method according to claim 7 wherein the first default value is a predetermined value which is used to update all records.

15. The method according to claim 7 wherein said step of changing the existing data in the first field is executed without retrieving the first default value from another record.

16. The method according to claim 7 wherein the first default value is a predetermined value which is used to update all records.

17. A method for updating records stored in a database comprising the steps of:

reading a next reset date associated with one of the records in the database;

comparing the next reset date with a current date;

determining, based on said comparing step, whether to change existing data stored in a first field of said one record before using said stored data;

reading a treatment value stored in the one record and using the treatment value to locate a parameter that defines an operation to be performed on the data in said first field storing the existing data prior to incorporation of new data;

comparing at least one of the existing data and the new data to the parameter; and, generating a message dependent on the result of the comparison.

18. A database that stores records which are updated with information comprising:

means for reading a next reset date associated with one of the records in the database;

means for comparing the next reset date with a current date;

means, coupled to said comparing means, for determining whether to change existing data stored in a first field of said one record before using said stored data based on results of said comparing means; and means for reading a treatment value stored in the one record and using the treatment value to locate a parameter that defines an operation to be performed on the data in said first field means for storing the existing data prior to incorporation of new data;

means for comparing at least one of the existing data and the new data to the parameter; and means for generating a message dependent on the result of the comparison.

19. A database that stores records which are updated with information comprising:

means for reading a next reset date associated with one of the records in the database;

means for comparing the next reset date with a current date;

means for changing, if the current date is later than the next reset date, existing data in a first field to updated data which is calculated based on a first default value and new data;

means for combining, if the current date is prior to the next reset date, the existing data in the first field with the new data, whereby information stored in the first field is updated based on a relationship between the current date and the next reset date.

20. The database according to claim 19 further comprising:

means for calculating another next reset date if the current date is past the next reset date; and means for replacing, if another next reset date is calculated, the next reset date stored in the record with the another next reset date.

21. The database according to claim 20 further comprising means for reading interval data stored in the one record in a reset interval field, said calculating means basing the another next reset date on the interval data.

22. The database according to claim 19 further comprising means for reading a treatment value stored in the one record and using the treatment value to locate a parameter that defines an operation to be performed on the existing data in said first field.

23. The database according to claim 22 further comprising means for comparing the existing data stored in the first field and the parameter, and means for transmitting an alert message dependent on the result of the comparison.

24. The database according to claim 22 further comprising means for storing the existing data prior to incorporation of the new data, means for comparing at least one of the existing data and the new data to the parameter, and means for generating a message dependent on the result of the comparison.

25. The database according to claim 19 wherein changing the existing data in the first field can always be executed since the first default value is available without having to retrieve the first default value from another record.

26. The database according to claim 19 wherein the first default value is a predetermined value which is used to update all records.

27. The database according to claim 19 wherein said means for changing executes the changing of the existing data in the first field without retrieving the first default value from another record.

28. The database according to claim 19 wherein the first default value is a predetermined value which is used to update all records.

* * * * *